(12) United States Patent
Diankov

(10) Patent No.: US 11,045,948 B2
(45) Date of Patent: Jun. 29, 2021

(54) CONTROL APPARATUS, WORK ROBOT, NON-TRANSITORY COMPUTER-READABLE MEDIUM, AND CONTROL METHOD

(71) Applicant: MUJIN, Inc., Tokyo (JP)

(72) Inventor: Rosen Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 16/782,085

(22) Filed: Feb. 5, 2020

(65) Prior Publication Data

US 2020/0171656 A1 Jun. 4, 2020

Related U.S. Application Data

(63) Continuation of application No. PCT/JP2019/023777, filed on Jun. 14, 2019.

(30) Foreign Application Priority Data

Oct. 15, 2018 (JP) .............................. JP2018-194057

(51) Int. Cl.
*B25J 9/16* (2006.01)
(52) U.S. Cl.
CPC .............. *B25J 9/163* (2013.01); *B25J 9/1666* (2013.01); *B25J 9/1679* (2013.01)
(58) Field of Classification Search
CPC ........ B25J 9/163; B25J 9/1666; B25J 9/1679; G05B 2219/40317; G05B 2219/40475;
(Continued)

(56) References Cited

U.S. PATENT DOCUMENTS 4,888,707 A * 12/1989 Shimada ............ G05B 19/4061
700/255
10,350,752 B2 7/2019 Satou
(Continued)

FOREIGN PATENT DOCUMENTS

DE 102015208584 A1 11/2015
DE 102015115115 A1 3/2016
(Continued)

OTHER PUBLICATIONS

Office Action issued for counterpart German Application No. 112019000097.7, issued by the German Patent and Trade Mark Office dated Jun. 4, 2020.
(Continued)

*Primary Examiner* — Ryan Rink
(74) *Attorney, Agent, or Firm* — Medler Ferro Woodhouse & Mills PLLC

(57) ABSTRACT

A control apparatus for controlling operation of a work robot for performing work inside a target region using a manipulator includes a trajectory information acquiring unit for acquiring N−1 or N pieces of trajectory information respectively indicating N−1 or N trajectories connecting N work regions where the work robot performs a series of work operations in order of a series of work operations; a classifying unit for classifying the N−1 or N trajectories as (i) trajectories that need correction or (ii) trajectories that do not need correction; and a trajectory planning unit for planning a trajectory of a tip of the manipulator between two work regions relating to the each of the one or more trajectories, for each of the one or more trajectories classified as a trajectory that needs correction by the classifying unit.

18 Claims, 8 Drawing Sheets

(58) Field of Classification Search
CPC ........... G05B 2219/40492; G05B 2219/40516; G05B 2219/40521
See application file for complete search history.

(56) References Cited

U.S. PATENT DOCUMENTS

| | | | | |
|---|---|---|---|---|
| 10,695,909 | B2* | 6/2020 | Yamamoto | B25J 9/1676 |
| 2013/0178980 | A1* | 7/2013 | Chemouny | B25J 9/1671 |
| | | | | 700/255 |
| 2014/0031982 | A1 | 1/2014 | Yamada | |
| 2015/0100194 | A1 | 4/2015 | Terada | |
| 2015/0251315 | A1 | 9/2015 | Brandenberger | |
| 2015/0321354 | A1 | 11/2015 | Nishihara | |
| 2016/0075025 | A1* | 3/2016 | Maeda | B25J 9/1671 |
| | | | | 700/255 |
| 2016/0075031 | A1 | 3/2016 | Gotou | |
| 2017/0274528 | A1* | 9/2017 | Inaba | B25J 9/163 |
| 2018/0195858 | A1 | 7/2018 | Nishikawa | |
| 2018/0236657 | A1 | 8/2018 | Kuwahara | |
| 2019/0232488 | A1 | 8/2019 | Levine | |
| 2019/0375112 | A1 | 12/2019 | Mariyama | |
| 2020/0198140 | A1* | 6/2020 | Dupuis | B25J 9/1666 |
| 2020/0206928 | A1* | 7/2020 | Denenberg | G01S 17/89 |

FOREIGN PATENT DOCUMENTS

| | | | |
|---|---|---|---|
| DE | 112016003107 | T5 | 4/2018 |
| DE | 202017105598 | U1 | 5/2018 |
| DE | 102018001781 | A1 | 9/2018 |
| DE | 112017007028 | T5 | 10/2019 |
| EP | 3195990 | A1 | 7/2017 |
| EP | 3363604 | A2 | 8/2018 |
| JP | H08108383 | A | 4/1996 |
| JP | H0934524 | A | 2/1997 |
| JP | H11347984 | A | 12/1999 |
| JP | 2010152684 | A | 7/2010 |
| JP | 2010172990 | A | 8/2010 |
| JP | 2013193194 | A | 9/2013 |
| JP | 2014024162 | A | 2/2014 |
| JP | 2016091053 | A | 5/2016 |
| JP | 2016147330 | A | 8/2016 |
| JP | 2017033429 | A | 2/2017 |
| JP | 2018134703 | A | 8/2018 |

OTHER PUBLICATIONS

International Search Report and (ISA/237) Written Opinion of the International Search Authority for International Patent Application No. PCT/JP2019/023777, mailed by the European Patent Office dated Oct. 25, 2019.

Alistair McLean, Update and repair of a roadmap after model error discovery, Robotics and Autonomous System 21 (1997), p. 51-p. 67, INRIA Rhone Alpes and GRAVIR, Grenoble, France.

Olzhas Adiyatov et al., A Novel RRT-Based Algorithm for Motion Planning in Dynamic Environments, Proceedings of 2017 IEEE International Conference on Mechatronics and Automation, Aug. 6-9, Takamatsu, Japan, p. 1416-p. 1421.

Decision to Grant a Patent issued for counterpart Japanese Application No. 2018-194057, issued by the Japanese Patent Office dated Mar. 5, 2019 (drafted on Feb. 28, 2019).

Decision to Grant a Patent issued for counterpart Japanese Application No. 2019-026456, issued by the Japanese Patent Office dated Aug. 6, 2019 (drafted on Jul. 30, 2019).

Decision to Grant a Patent issued for counterpart Japanese Application No. 2019-103655, issued by the Japanese Patent Office dated Jul. 2, 2019 (drafted on Jun. 24, 2019).

* cited by examiner

CONTROL APPARATUS, WORK ROBOT, NON-TRANSITORY COMPUTER-READABLE MEDIUM, AND CONTROL METHOD

CROSS REFERENCE TO RELATED APPLICATION

This is a continuation application of International Application No. PCT/JP2019/023777 filed on Jun. 14, 2019, which claims priority to Japanese Patent Application No. 2018-194057 filed in JP on Oct. 15, 2018, the contents of each of which are incorporated herein by reference.

BACKGROUND

1. Technical Field

The present invention relates to a control apparatus, a work robot, a non-transitory computer-readable medium, and a control method.

Background Art

A picking system is known that uses a manipulator to take out a workpiece housed in a container and arrange this workpiece at a specified location inside another container, as shown in Patent Documents 1 to 3, for example. Furthermore, an industrial robot is known that performs various types of work using a manipulator.

CITATION LIST

Patent Literature

[PTL1] Japanese Patent Application Publication No. 2016-091053
[PTL2] Japanese Patent Application Publication No. 2016-147330
[PTL3] Japanese Patent Application Publication No. 2017-033429

DESCRIPTION OF EXEMPLARY EMBODIMENTS

Figure 1:
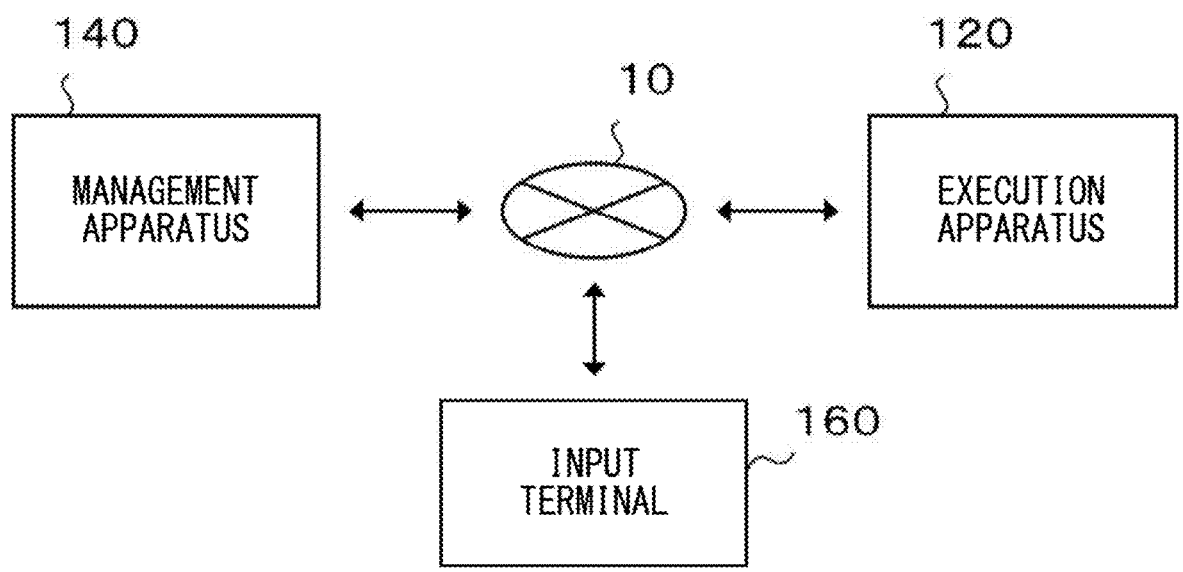
FIG. 1 schematically shows an example of a system configuration of the work system 100.

Hereinafter, some embodiments of the present invention will be described. The embodiments do not limit the invention according to the claims, and all the combinations of the features described in the embodiments are not necessarily essential to means provided by aspects of the invention. In the drawings, identical or similar portions may be given the same reference numerals, and redundant explanations may be omitted.

[Schematic of the Work System 100]

FIG. 1 schematically shows an example of a system configuration of the work system 100. In the present embodiment, the work system 100 includes one or more execution apparatuses 120 and a management apparatus 140. The work system 100 may include one or more input terminals 160. Each section of the work system 100 may send and receive information to and from each other, via a communication network 10. In this specification, the term "one or more" means "one or a plurality".

The execution apparatus 120 may be an example of a work robot. The management apparatus 140 may be an example of a control apparatus.

In the present embodiment, the communication network 10 may be a transmission path for wired communication, a transmission path for wireless communication, or a combination of a transmission path for wired communication and a transmission path for wireless communication. The communication network 10 may include a wireless packet communication network, the Internet, a P2P network, a dedicated line, a VPN, a power line communication line, or the like. The communication network 10 may include (i) a mobile communication network such as a mobile telephone network or (ii) a wireless communication network such as wireless MAN (e.g. WiMAX (Registered Trademark)), wireless LAN (e.g. WiFi (Registered Trademark)), Bluetooth (Registered Trademark), Zigbee (Registered Trademark), or NFC (Near Field Communication).

In the present embodiment, the execution apparatus 120 performs various types of work. The execution apparatus 120 may include a robot for performing the various types of work using a manipulator. This robot may be a mechanical system including a sensor, a drive system, and a control system. This robot may be an industrial robot for manufacturing an object. The type of work is exemplified by picking work, drilling work, cutting work, lathe work, welding work, assembling work, painting work, or the like. The details of the execution apparatus 120 are described further below.

In the present embodiment, the management apparatus 140 manages the execution apparatus 120. For example, the management apparatus 140 controls the operation of the execution apparatus 120. The management apparatus 140 may control the operation of the execution apparatus 120 by determining parameters (sometimes referred to as control parameters) for controlling the operation of the execution apparatus 120. The management apparatus 140 may manage various types of setting information for controlling the operation of the execution apparatus 120.

Here, the robot of the execution apparatus 120 is automatically controlled by a program, and performs the designated work in a designated region (sometimes referred to as a work region) of an object (sometimes referred to as a work target) that is a target of the work. If a plurality of work regions are designated for a single object, the robot performs the designated work in each work region while moving in order between the plurality of work regions.

There are cases where the operation of the robot is programmed in detail for each type of work in order to improve the work efficiency of the execution apparatus 120. Furthermore, there are cases where the operation of the robot is programmed in detail for each type of object, for the same type of work. Such work is sometimes referred to as teaching work.

For example, in a case where the robot moves between two work regions, there is an idea to have an imaging apparatus capture an image of the area around the movement trajectory of the robot and to have the robot move between these two work regions while analyzing the image data from the imaging apparatus, in order to prevent the robot and other bodies from interfering with each other. However, in such a case, the execution apparatus 120 stops moving or reduces its movement velocity while the image processing is being performed. As a result, the work speed of the execution apparatus 120 drops, causing the manufacturing throughput to also drop.

On the other hand, by performing the teaching work for the execution apparatus 120 before a specified type of work is performed on a specified type of object, the execution apparatus 120 can move the robot between the two work regions without analyzing the captured image of the area around the movement trajectory of the robot. In this way, the work efficiency of the execution apparatus 120 is improved. The execution apparatus 120 may include a camera for observing the work regions. Furthermore, the analysis process of the captured image of the area around the movement trajectory of the robot may be performed when determining the operation of the execution apparatus 120, to a degree that has a small effect on the work efficiency.

In the teaching, first, a simulation model for determining interference in a virtual three-dimensional space is constructed. The constructed simulation model is then used to program the operation of the robot such that the robot performs the series of work operations without interference with other bodies. Next, testing and fine adjustments are repeated using an actual robot, and the operation of the robot is programmed precisely. In this way, an enormous amount of time and effort is required for the teaching operation. Therefore, there is a desire to reduce the burden of the teaching work.

According to the present embodiment, if a change has occurred in the structure of the execution apparatus 120, if a change has occurred in the settings of the execution apparatus 120, if the target object of the execution apparatus 120 has been changed, or if the surrounding environment of the execution apparatus 120 has been changed, the management apparatus 140 plans the operation of the robot such that the robot performs the series of work operations without interference with other bodies. The management apparatus 140 plans the trajectory of the manipulator of the robot using inverse kinematic techniques and inverse kinetic techniques.

However, when planning the operation of the robot, there is a possibility that an extremely large calculation amount is required, which results in a long calculation time. Therefore, according to the present embodiment, the management apparatus 140 narrows down the regions where precise calculation is required, due to the changes described above, in the trajectory of the manipulator. In this way, the calculation amount for planning the operation of the robot is reduced, and the calculation time is shortened. As a result, when content of various types of changes is input to the management apparatus 140 by a user of the execution apparatus 120, the management apparatus 140 outputs a trajectory of the manipulator that reflects the content of these changes, within a practical amount of time. In this way, according to the present embodiment, the burden of the teaching work is significantly reduced. The details of the management apparatus 140 are described further below.

In the present embodiment, the input terminal 160 is a communication terminal used by a user of the work system 100, for example, and the details of the input terminal 160 are not particularly limited. The input terminal 160 is exemplified by a personal computer, a mobile terminal, or the like. The mobile terminal is exemplified by a mobile telephone, a smart phone, a PDA, a tablet, a notebook computer, a laptop computer, a wearable computer, or the like. The input terminal 160 may be used as a user interface of at least one of the execution apparatus 120 and the management apparatus 140.

In the present embodiment, the details of the work system 100 are described using an example in which the management apparatus 140 manages the execution apparatus 120. However, the work system 100 is not limited to the present embodiment. At least a portion of the functions of the management apparatus 140 may be realized by at least one of the execution apparatus 120 and the input terminal 160. In this case, the execution apparatus 120 may be an example of the control apparatus. Furthermore, the input terminal 160 may be an example of the control apparatus.

[Detailed Configuration of Each Section in the Work System 100]

Each section of the work system 100 may be realized by hardware, by software, or by both hardware and software. At least part of each section of the work system 100 may be realized by a single server or by a plurality of servers. At least part of each section of the work system 100 may be realized on a virtual server or a cloud system. At least part of each section of the work system 100 may be realized by a personal computer or a mobile terminal. The mobile terminal can be exemplified by a mobile telephone, a smart phone, a PDA, a tablet, a notebook computer, a laptop computer, a wearable computer, or the like. Each section of the work system 100 may store information, using a distributed network or distributed ledger technology such as block chain.

If at least some of the components forming the work system 100 are realized by software, these components realized by software may be realized by starting up programs in which operations corresponding to these components are defined, with an information processing apparatus having a general configuration. The information processing apparatus having the general configuration described above may include (i) a data processing apparatus having a processor such as a CPU or a GPU, a ROM, a RAM, a communication interface, and the like, (ii) an input apparatus such as a keyboard, a pointing device, a touch panel, a camera, an audio input apparatus, a gesture input apparatus, various sensors, or a GPS receiver, (iii) an output apparatus such as a display apparatus, an audio output apparatus, or a vibration apparatus, and (iv) a storage apparatus (including an external storage apparatus) such as a memory, an HDD, or an SSD.

In the information processing apparatus having the general configuration described above, the data processing apparatus or the storage apparatus described above may store the programs described above. The programs described above cause the information processing apparatus described above to perform the operations defined by these programs, by being executed by the processor. The programs described above may be stored in a non-transitory computer readable storage medium. The programs described above may be stored in a computer readable medium such as a CD-ROM, a DVD-ROM, a memory, or a hard disk, or may be stored in a storage apparatus connected to a network.

The programs described above may cause a computer to function as a portion of or the entire work system 100. The programs described above may include modules in which the operations of the sections of the work system 100 are defined. These programs and modules act on the data processing apparatus, the input apparatus, the output apparatus, the storage apparatus, and the like to cause the computer to function as each section of the work system 100 and to cause the computer to perform the information processing method in each section of the work system 100.

The programs described above may be installed in the computer forming at least part of the work system 100, from the computer readable medium or the storage apparatus connected to the network. The computer may be caused to function as at least a portion of each section of the work system 100, by executing the programs described above. By having the computer read the programs described above, the information processes recorded in these programs function as the specific means realized by the cooperation of software relating to these programs and various hardware resources of some or all of the work system 100. These specific means realize computation or processing of the information corresponding to an intended use of the computer in the present embodiment, thereby forming the work system 100 corresponding to this intended use.

The programs described above may be programs for causing the computer to perform the information processing methods of some or all of the work system 100. The information processing method described above may be a method for controlling the operation of the work robot. This work robot performs work inside a target region using the manipulator, for example.

The control method is for controlling operation of a work robot that performs work inside a target region using a manipulator, and includes a change information acquiring step of acquiring at least one of (i) first change information concerning at least one of one or more bodies arranged inside the target region and indicates occurrence of a change concerning at least one of a position, orientation, shape, and size of the at least one body and (ii) second change information indicating that a new body is to be arranged inside the target region, for example. The control method includes a model information acquiring step of acquiring at least one of (i) first model information indicating the position, orientation, shape, and size of each of the one or more bodies after the change has occurred and (ii) second model information indicating the position, orientation, shape, and size of the new body, for example.

The control method includes a trajectory information acquiring step of acquiring N−1 or N pieces of trajectory information respectively indicating N−1 or N trajectories connecting N work regions where the work robot performs a series of work operations in order of the series of work operations, for example. The control method includes a classifying step of classifying the N−1 or N trajectories as (i) trajectories that need correction due to a change inside the target region indicated by at least one of the first change information and the second change information or (ii) trajectories that do not need correction even if a change occurs inside the target region indicated by at least one of the first change information and the second change information, for example. The control method includes a trajectory planning step of planning a trajectory of a tip of the manipulator between two work regions relating to respective trajectories, based on at least one of the first model information and the second model information, for each of the one or more trajectories classified as a trajectory that needs correction in the classification step, for example. In the control method, N may be an integer greater than or equal to 2.

Figure 2:
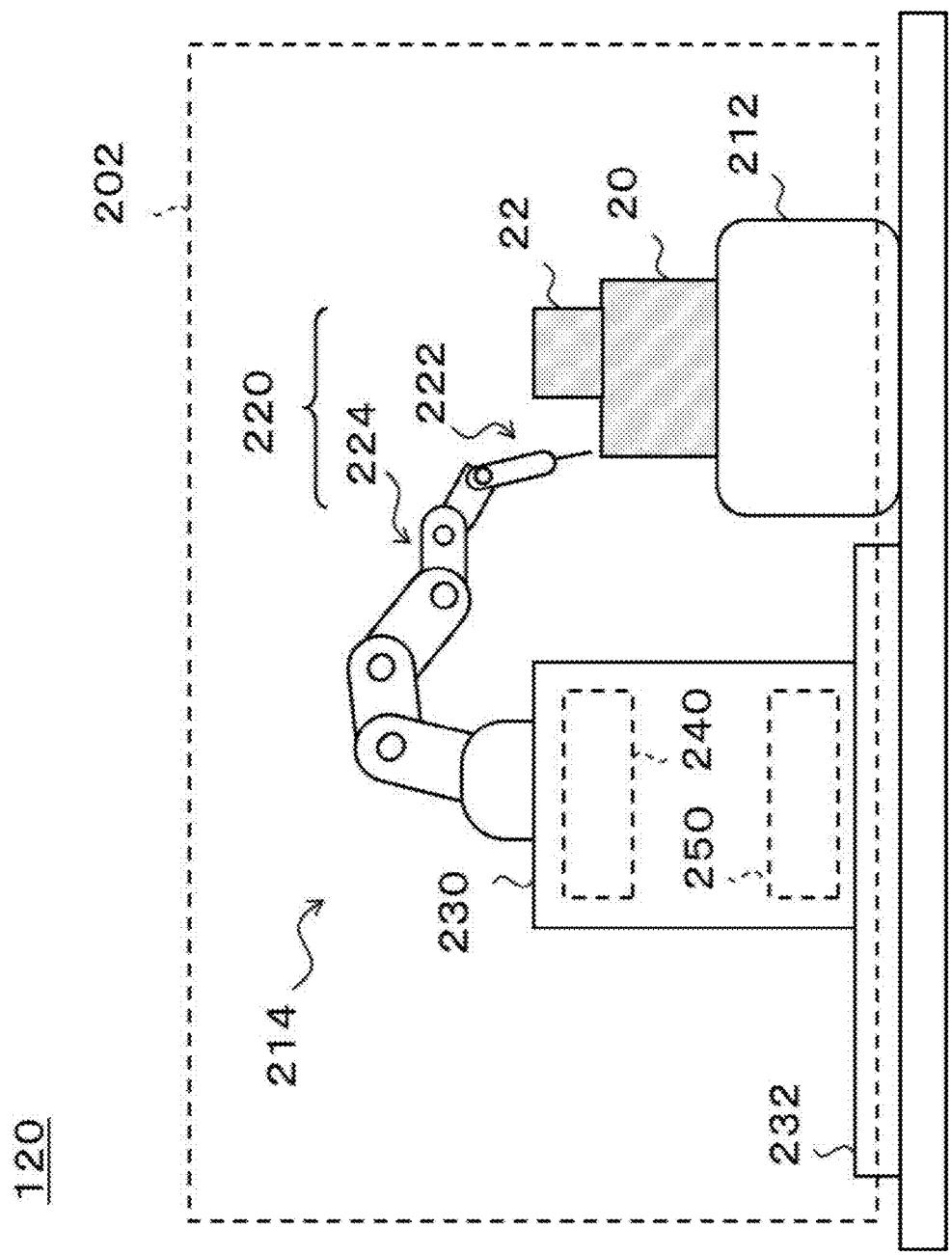
FIG. 2 schematically shows an example of a system configuration of the execution apparatus 120.

FIG. 2 schematically shows an example of a system configuration of the execution apparatus 120. In the present embodiment, the execution apparatus 120 includes a conveyor 212 and a robot 214. In the present embodiment, the robot 214 includes a manipulator 220, a platform 230, a rail 232, a drive section 240, and a drive control section 250. In the present embodiment, the manipulator 220 includes a work tool 222 and a robot arm 224.

The robot 214 may include a single manipulator 220 or a plurality of manipulators 220. The robot 214 may perform work on a single workpiece 20 using a single manipulator 220, or may perform work on a single workpiece 20 using a plurality of manipulators 220. The robot 214 may perform work on a plurality of workpieces 20 at once, using a single manipulator 220.

The robot 214 may be an example of the work robot. The work tool 222 may be an example of a tip of the manipulator 220. The trajectory of the work tool 222 may be an example of a trajectory of the tip of the manipulator 220. The position and orientation of the work tool 222 may be an example of the position and orientation of the tip of the manipulator 220.

In the present embodiment, the execution apparatus 120 performs predetermined work on a workpiece 20 arranged inside a target region 202. The target region 202 may be a region in which the execution apparatus 120 can perform work. The workpiece 20 may have one or more protruding portions 22. The type of work is exemplified by picking work, drilling work, lathe work, welding work, assembling work, painting work, or the like.

In the present embodiment, the conveyor 212 transports the workpiece 20. For example, the conveyor 212 transports the workpiece 20 from outside the target region 202 to a predetermined position inside the target region 202. When the work on the workpiece 20 by the robot 214 is finished, the conveyor 212 transports the workpiece 20 to the outside of the target region 202.

In the present embodiment, the robot 214 performs each type of work on the workpiece 20. For example, the robot 214 performs work inside the target region 202 using the manipulator 220. At least a portion of the operation of the robot 214 is controlled by the management apparatus 140.

In the present embodiment, the work tool 222 is a jig, equipment, or a tool corresponding to specified work. The details of the work tool 222 are not particularly limited. The work tool 222 may have a shape, structure, and function in accordance with the corresponding work. The work tool 222 may include various sensors. The work tool 222 may include an imaging apparatus such as a camera. The work tool 222 is attached to the tip of the robot arm 224, for example. The robot 214 can be made to correspond to each type of work by exchanging the work tool 222.

In the present embodiment, the robot arm 224 is connected to the work tool 222, and adjusts the position and orientation of the work tool 222. The structure of the robot arm 224 is not particularly limited, and a multi jointed robot arm having a plurality of joints is used, for example. The robot arm 224 may include various sensors such as a mass measuring sensor and a load measuring sensor. The load measuring sensor may be a sensor that measures torque, a current value, or a voltage value of the drive section 240 that drives each joint of the robot arm 224.

In the present embodiment, the platform 230 supports the manipulator 220. The platform 230 may be a fixed platform, or may be a movable platform. In the present embodiment, the platform 230 can move on a rail 232, along an extension direction of the rail 232. In this way, the work tool 222 can reach any position in the target region 202. The platform 230 may house at least a portion of the drive section 240 therein. The platform 230 may house at least a portion of the drive control section 250 therein.

In the present embodiment, the drive section 240 drives the manipulator 220. In the present embodiment, the drive section 240 drives the work tool 222. In the present embodiment, the drive section 240 supplies the work tool 222 with fluid and suctions fluid from the work tool 222. The drive section 240 may be a pump. The drive section 240 may include one or more pumps. The fluid may be a gas used for fusing or welding, or may be a fluid for cooling or cleaning. In another embodiment, the drive section 240 may supply power to the work tool 222. For example, the drive section 240 may be an element that controls the supply of power to the work tool 222.

In yet another embodiment, the drive section 240 drives the robot arm 224. For example, the drive section 240 adjusts the angle of each joint of the robot arm 224. The drive section 240 may be a motor. The drive section 240 may include one or more motors. In yet another embodiment, the drive section 240 drives the platform 230. For example, the drive section 240 adjusts the relative positions of the workpiece 20 and the platform 230. The drive section 240 may be a motor. The drive section 240 may include one or more motors.

The drive control section 250 controls the drive section 240. For example, the drive control section 250 receives a command for controlling the work of the robot 214 on the workpiece 20, from the management apparatus 140. The drive control section 250 controls the drive section 240 based on the command from the management apparatus 140.

The command for controlling the work performed on the workpiece 20 may be information indicating the trajectory of the work tool 222. The information indicating the trajectory of the work tool 222 can be exemplified by (i) information indicating the initial arrangement, transitional arrangement, final arrangement, and movement time of the work tool 222, (ii) information indicating the angle of each joint and the movement time of the work tool 222 at the initial arrangement, the transitional arrangement, and the final arrangement, (iii) information indicating the arrangement of the work tool 222 at each timing during the movement time, (iv) information indicating the angle of each joint of the work tool 222 at each timing during the movement time, and the like. The arrangement of the work tool 222 is specified by the position and orientation of the work tool 222, for example.

Figure 3:
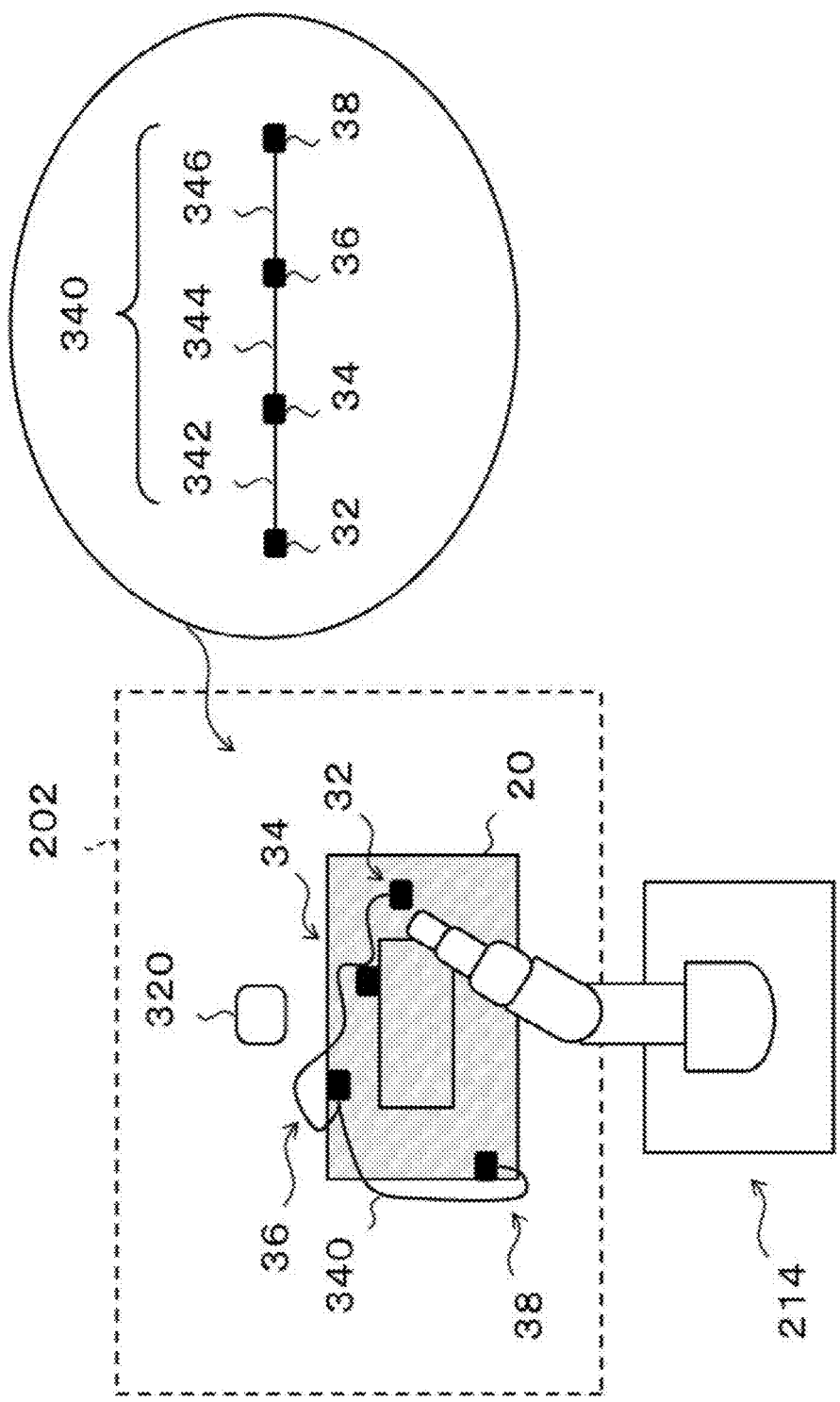
FIG. 3 schematically shows an example of the overall trajectory 340.
Figure 4:
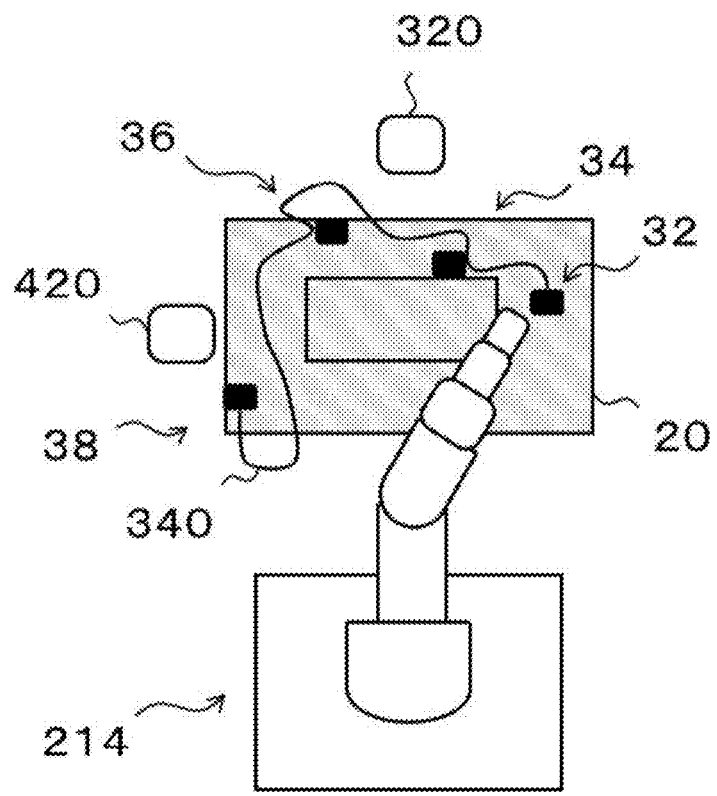
FIG. 4 schematically shows an example of the overall trajectory 340.
Figure 5:
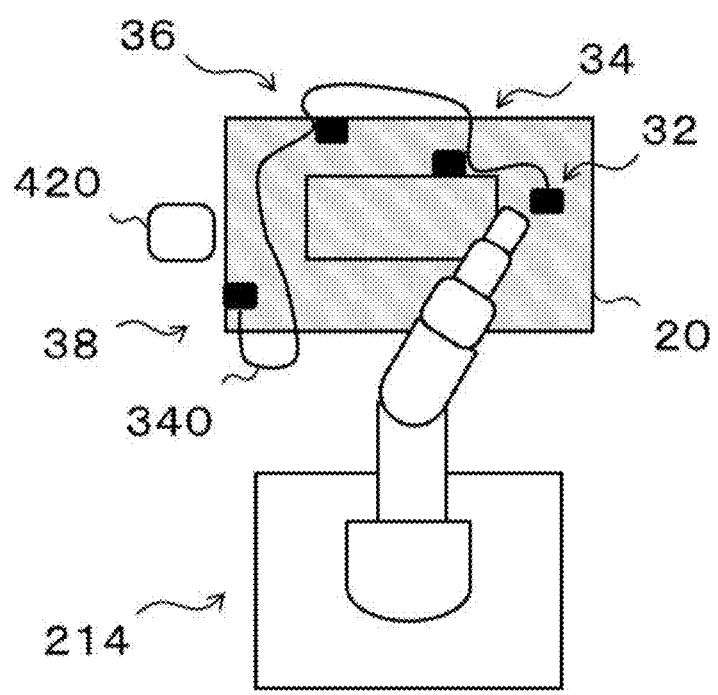
FIG. 5 schematically shows an example of the overall trajectory 340.

FIGS. 3, 4, and 5 are used to describe change in an overall trajectory 340 that accompanies change in the surrounding environment of the execution apparatus 120 or change of the workpiece 20. FIG. 3 schematically shows an example of the overall trajectory 340 in a case where an obstacle 320 is present inside the target region 202. FIG. 4 schematically shows an example of the overall trajectory 340 in a case where an obstacle 420 is added inside the target region 202 shown in FIG. 3. FIG. 5 schematically shows an example of the overall trajectory 340 in a case where the obstacle 320 has been removed from the inside of the target region 202, from the state shown in FIG. 4.

In the embodiment described in relation to FIG. 3, the robot 214 performs the series of work operations designated by the user, at each of a work point 32, a work point 34, a work point 36, and a work point 38. In the present embodiment, after the work has been performed at the work point 32, the robot 214 moves the work tool 222 along the unit trajectory 342 to the work point 34. Similarly, after the work has been performed at the work point 34, the robot 214 moves the work tool 222 along the unit trajectory 344 to the work point 36. Furthermore, after the work has been performed at the work point 36, the robot 214 moves the work tool 222 along the unit trajectory 346 to the work point 38.

The unit trajectory 342, the unit trajectory 344, and the unit trajectory 346 are each planned such that the distance between the manipulator 220 and other bodies arranged inside the target region 202 is greater than a predetermined value (sometimes referred to as an interference margin). In this way, interference between the manipulator 220 and the other bodies described above is prevented. For example, in the present embodiment, the unit trajectory 344 is planned such that there is no interference with the obstacle 320 and the protruding portion 22 of the workpiece 20.

The work point 32, the work point 34, the work point 36, and the work point 38 are examples of N work regions (N is an integer greater than or equal to 2, but may instead be an integer greater than or equal to 3 or an integer greater than or equal to 4) at which the work robot performs the series of work operations. The work point 32, the work point 34, the work point 36, and the work point 38 may each be an example of a work region. There are cases where the robot 214 causes the work tool 222 to move along a specified route inside the work region, according to the type of work. In such a case, the work point 32, the work point 34, the work point 36, and the work point 38 may each be any location inside the work region, and may each be a location where the work tool 222 is arranged when the work in the respective work region is started.

The unit trajectory 342, the unit trajectory 344, and the unit trajectory 346 form the overall trajectory 340 that indicates the trajectory of the work tool 222 that has passed through the series of work operations. The unit trajectory 342, the unit trajectory 344, and the unit trajectory 346 may be examples of N−1 or N trajectories that connect N work regions where the series of work operations is performed, in the order of this series of work operations.

In a case where a home position is set for the work tool 222, the robot 214 may move the work tool 222 from the home position to the work point 32 before starting the work at the work point 32. Furthermore, the robot 214 may move the work tool 222 to the home position after the work at the work point 38 has been finished. In this case, the overall trajectory 340 of the work tool 222 is formed by N or N+1 trajectories that connect the home position and the N work positions where the series of work operations is performed, in the order of this series of work operations.

Furthermore, in the present embodiment, the trajectory of the work tool 222 is described using an example in which the work point 32 and the work point 38 are different locations or regions inside the target region 202. However, the trajectory of the work tool 222 is not limited to the present embodiment. In another embodiment, the work point 32 and the work point 38 may be the same location or region. In this case, the overall trajectory 340 of the work tool 222 includes (i) the unit trajectory 342, the unit trajectory 344, and the unit trajectory 346 and (ii) a unit trajectory connecting the work point 38 and the work point 32.

According to the embodiment described in relation to FIG. 4, the obstacle 420 is added near the unit trajectory 346 in a state where the series of work operations are being performed while the robot 214 moves the work tool 222 along the overall trajectory 340 shown in FIG. 3. The obstacle 420 is arranged at a position in the unit trajectory 346 that causes interference with the manipulator 220, for example.

According to the present embodiment, the user manipulates the input terminal 160 to transmit information (sometimes referred to as change information) indicating that the obstacle 420 is to be added near the unit trajectory 346, to the management apparatus 140. Upon receiving this change information, the management apparatus 140 determines whether it is necessary to plan a new overall trajectory 340.

More specifically, for each of the unit trajectory 342, the unit trajectory 344, and the unit trajectory 346, the management apparatus 140 determines whether there is a high degree of necessity for replanning this unit trajectory due to the addition of the obstacle 420. The management apparatus 140 may determine whether there is a high degree of necessity for replanning the unit trajectory based on the corresponding unit trajectory 342, unit trajectory 344, or unit trajectory 346 and the relationship degree thereof to the obstacle 420. The management apparatus 140 may extract a unit trajectory having a high degree of necessity for replanning the trajectory.

If the relationship degree between a specified unit trajectory and the obstacle 420 is greater than a predetermined amount, the management apparatus 140 may determine that there is a high degree of necessity for replanning this specified unit trajectory. If the relationship degree between a specified unit trajectory and the obstacle 420 is less than a predetermined amount, the management apparatus 140 may determine that there is not a high degree of necessity for replanning this specified unit trajectory. For example, if the possibility of interference between the specified unit trajectory and the obstacle 420 is high, the management apparatus 140 determines that the relationship degree between the specified unit trajectory and the obstacle 420 is greater than the predetermined amount.

If a unit trajectory having a high degree of necessity for replanning the trajectory is extracted, the management apparatus 140 determines that a new overall trajectory 340 must be planned. The management apparatus 140 then replans the trajectory of the extracted unit trajectory while taking into consideration the position, orientation, shape, and size of the obstacle 420. Furthermore, the management apparatus 140 reuses the information concerning the current trajectory for the other unit trajectories. On the other hand, if no unit trajectories having a high degree of necessity for replanning the trajectory are extracted, the management apparatus 140 determines that there is no need to plan a new overall trajectory 340.

For example, according to the present embodiment, it is judged that the unit trajectory 342 and the unit trajectory 344 are not unit trajectories having a high degree of necessity for replanning the trajectory, and it is judged that the unit trajectory 346 is a unit trajectory having a high degree of necessity for replanning the trajectory. Therefore, the management apparatus 140 plans a changed overall trajectory 340 based on the current unit trajectory 342, the current unit trajectory 344, and a changed unit trajectory 346.

In this way, even when the obstacle 420 is added inside the target region 202, it is possible to plan a changed overall trajectory 340 in a short time. It should be noted that there is also an idea for reducing the calculation amount for planning the changed overall trajectory 340 by replanning only the region where the obstacle 420 causes interference within the unit trajectory 346 determined to have a high degree of necessity for replanning the trajectory.

However, in such a case, it is also conceivable that the shape of the trajectory would not be smooth and an excessive burden would be placed on the joints of the manipulator 220 after the robot 214 restarts the work, due to the position of the obstacle 420. Furthermore, the unit trajectory 346 before the change is optimized for a case where the obstacle 420 is not present. Therefore, the trajectory obtained by changing only the region in the unit trajectory 346 where there is interference with the obstacle 420 is not necessarily a suitable trajectory for connecting the start point and the end point of the unit trajectory 346, and it is possible that another more suitable trajectory exists.

On the other hand, according to the present embodiment, the entire unit trajectory 346 is replanned. Therefore, compared to a case where only the region of the unit trajectory 346 where there is interference with the obstacle 420 is replanned, it is possible to derive a more suitable trajectory.

According to the embodiment described in relation to FIG. 5, the obstacle 320 arranged ear the unit trajectory 344 is removed from the target region 202 in a state where the robot 214 is performing the series of work operations while moving the work tool 222 along the overall trajectory 340 shown in FIG. 4. The obstacle 320 may be moved to a location inside the target region 202 that is farther from the unit trajectory 344 than the current position.

According to the present embodiment, the user manipulates the input terminal 160 to transmit information (sometimes referred to as the change information) indicating that the obstacle 320 is to be removed or moved, to the management apparatus 140. Upon receiving this change information, the management apparatus 140 first determines whether it is necessary to plan a new overall trajectory 340.

More specifically, for each of the unit trajectory 342, the unit trajectory 344, and the unit trajectory 346, the management apparatus 140 determines whether there is a high degree of necessity for replanning the unit trajectory, due to the removal or movement of the obstacle 320. The management apparatus 140 may determine whether there is a high degree of necessity for replanning a unit trajectory based on the relationship degree between the corresponding unit trajectory 342, unit trajectory 344, or unit trajectory 346 and the obstacle 320. The management apparatus 140 may extract a unit trajectory having a high degree of necessity for replanning the trajectory.

If the relationship degree between a specified unit trajectory and the obstacle 320 is greater than a predetermined amount, the management apparatus 140 may determine that there is a high degree of necessity for replanning this specified unit trajectory. If the relationship degree between a specified unit trajectory and the obstacle 320 is less than a predetermined amount, the management apparatus 140 may determine that there is not a high degree of necessity for replanning this specified unit trajectory. For example, if the possibility of the current trajectory already being planned in a manner to avoid the obstacle 320 is high, based on the specified unit trajectory, the management apparatus 140 determines that the relationship degree between the specified unit trajectory and the obstacle 320 is greater than the predetermined amount.

If a unit trajectory having a high degree of necessity for replanning the trajectory is extracted, the management apparatus 140 determines that a new overall trajectory 340 must be planned. The management apparatus 140 then replans the trajectory of the extracted unit trajectory while taking into consideration the removal of the obstacle 320 or the movement of the obstacle 320. Furthermore, the management apparatus 140 reuses the information concerning the current trajectory for the other unit trajectories. On the other hand, if no unit trajectories having a high degree of necessity for replanning the trajectory are extracted, the management apparatus 140 determines that there is no need to plan a new overall trajectory 340.

For example, according to the present embodiment, it is judged that the unit trajectory 342 and the unit trajectory 346 are not unit trajectories having a high degree of necessity for replanning the trajectory, and it is judged that the unit trajectory 344 is a unit trajectory having a high degree of necessity for replanning the trajectory. Therefore, the management apparatus 140 plans a changed overall trajectory 340 based on the current unit trajectory 342, a changed unit trajectory 344, and the current unit trajectory 346.

In this way, even when the obstacle 320 is removed from inside the target region 202 or moved to a position farther from the overall trajectory 340, it is possible to plan a more suitable overall trajectory 340 in a short time. It should be noted that there is also an idea for not replanning the trajectory in a case where the obstacle 320 is removed from inside the target region 202 or moved to a position farther from the overall trajectory 340, in order to reduce the calculation amount for planning the changed overall trajectory 340.

However, it is also conceivable that the current trajectory is planned on the assumption of the presence of the obstacle 320, and therefore in a case where the obstacle 320 is no longer present or a case where the obstacle 320 is positioned farther away, another more suitable trajectory exists. On the other hand, according to the present embodiment, even when the obstacle 320 is removed from inside the target region 202 or moved to a position farther from the overall trajectory 340, a unit trajectory that is highly related to the obstacle 320 is replanned, and therefore it is possible to derive a more suitable trajectory than in a case where the trajectory is not replanned.

Figure 6:
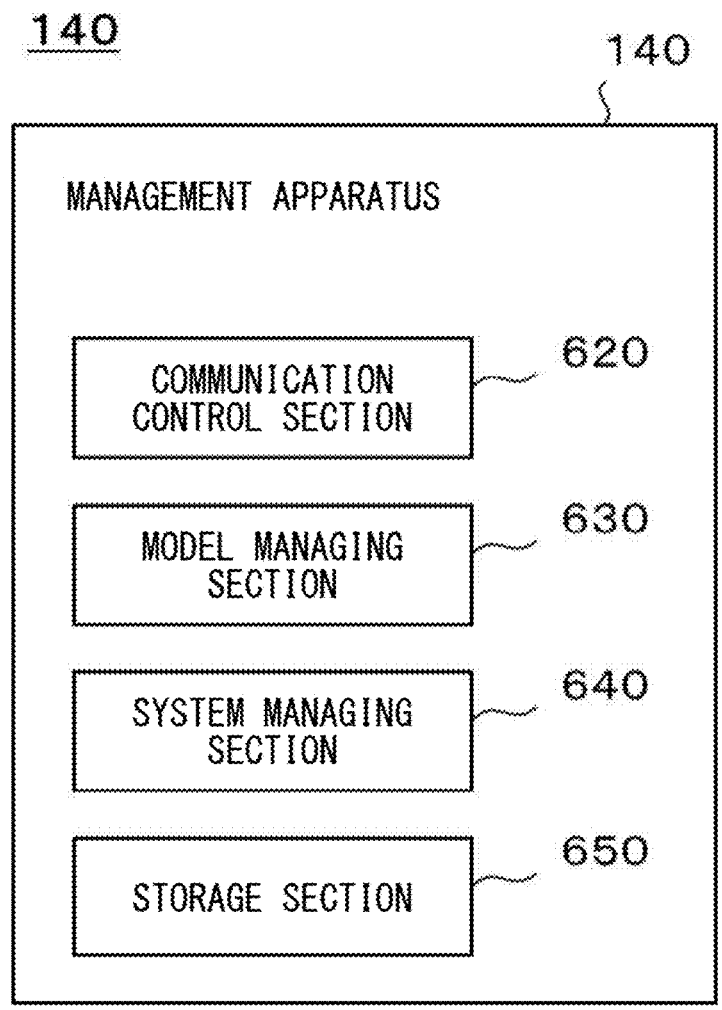
FIG. 6 schematically shows an example of a system configuration of the management apparatus 140.

FIG. 6 schematically shows an example of a system configuration of the management apparatus 140. In the present embodiment, the management apparatus 140 includes a communication control section 620, a model managing section 630, a system managing section 640, and a storage section 650.

The model managing section 630 may be an example of a change information acquiring section and a model information acquiring section. The system managing section 640 may be an example of a control apparatus.

In the present embodiment, the communication control section 620 controls the communication with at least one of the execution apparatus 120 and the input terminal 160. The communication control section 620 may be a communication interface. The communication control section 620 may correspond to a variety of types of communication methods.

In the present embodiment, the model managing section 630 manages information relating to one or more bodies arranged inside the target region 202. The model managing section 630 may manage information relating to one or more bodies that can be arranged inside the target region 202. The model managing section 630 may manage a simulation model of each of these one or more bodies. The model managing section 630 may manage information indicating the position, orientation, shape, and size of each of these one or more bodies. Examples of these bodies include the workpiece 20, the conveyor 212, the robot 214, the obstacle 320, the obstacle 420, portions thereof, or the like.

In one embodiment, the user manipulates the input terminal 160 to input information concerning the position, orientation, shape, and size of one or more bodies arranged inside the target region 202, and to transmit this information to the management apparatus 140. The management apparatus 140 may acquire the information input by the user, and store this information in the storage section 650.

In another embodiment, the user manipulates the input terminal 160 to input information (sometimes referred to as the change information) indicating the occurrence of a change relating to at least one of the position, orientation, shape, and size of one or more bodies arranged inside the target region 202, and to transmit this information to the management apparatus 140. This change includes the removal of a body from inside the target region 202. This change includes a change in at least one of the position, orientation, shape, and size of a body that accompanies operation of the body.

The information indicating the occurrence of a change may be information indicating that a change has occurred, or may be information indicating that a change will occur in the near future. This change information may be an example of first change information. The management apparatus 140 may acquire this change information and store this change information in the storage section 650.

The manipulates the input terminal 160 to input the information indicating the position, orientation, shape, and size of one or more bodies after the change has occurred, and to transmit this information to the management apparatus 140. The information indicating the position, orientation, shape, and size of one or more bodies after the change has occurred may be information concerning a changed feature among the position, orientation, shape, and size of one or more bodies. This information may be an example of first model information. The management apparatus 140 may acquire this information and store this information in the storage section 650.

In yet another embodiment, the user manipulates the input terminal 160 to input information indicating that a new body is arranged inside the target region 202, and to transmit this information to the management apparatus 140. This information may be an example of the change information. The information indicating that a new body has been arranged inside the target region 202 may be information indicating a new body arranged inside the target region 202, or may be information indicating a new body that is to be arranged inside the target region 202. This change information may be an example of second change information. The management apparatus 140 may acquire this change information and store this change information in the storage section 650.

The user manipulates the input terminal 160 to input the information indicating the position, orientation, shape, and size of this new body, and to transmit this information to the management apparatus 140. This information may be an example of second model information. The management apparatus 140 may acquire this information and store this information in the storage section 650.

In the present embodiment, the system managing section 640 manages the execution apparatus 120. For example, the system managing section 640 controls the operation of the execution apparatus 120. The system managing section 640 may control the operation of the execution apparatus 120 by determining control parameters of the execution apparatus 120. The system managing section 640 may manage each type of setting information for controlling the operation of the execution apparatus 120. The details of the system managing section 640 are described further below.

In the present embodiment, the storage section 650 acquires various types of information. In one embodiment, the storage section 650 stores information concerning the simulation models. The storage section 650 may store information indicating the position, orientation, shape, and size of one or more bodies arranged inside the target region 202. The storage section 650 may store information indicating at least one of the position, orientation, shape, and size after the change, which is information concerning a body for which this at least one of the position, orientation, shape, and size has been changed, among the one or more bodies arranged inside the target region 202. The storage section 650 may store information concerning a body to be removed from the target region 202. The storage section 650 may store information indicating the position, orientation, shape, and size of a body to be newly added to the target region 202.

In the present embodiment, the storage section 650 stores information concerning the work of the robot 214. The storage section 650 stores information indicating a work schedule. For example, the storage section 650 stores, in association with each of one or more work operations, identification information of the work, identification information of the target of the work, information indicating a timing at which the work is to be performed, information indicating a location where the work is to be performed, and information indicating content of the work.

The storage section 650 may store information indicating the trajectory of the work tool 222 for a series of work operations. The storage section 650 may store information indicating the overall trajectory of the work tool 222, or may store information indicating each of the plurality of unit trajectories forming this overall trajectory. The information indicating the trajectory of the work tool 222 may be a collection of pieces of information indicating the position and orientation of the work tool 222. The information indicating the overall trajectory or the unit trajectories of the work tool 222 may be information in which information indicating elapsed time from when the work tool 222 started moving and information indicating the position and orientation of the work tool 222 are associated with each other.

Figure 7:
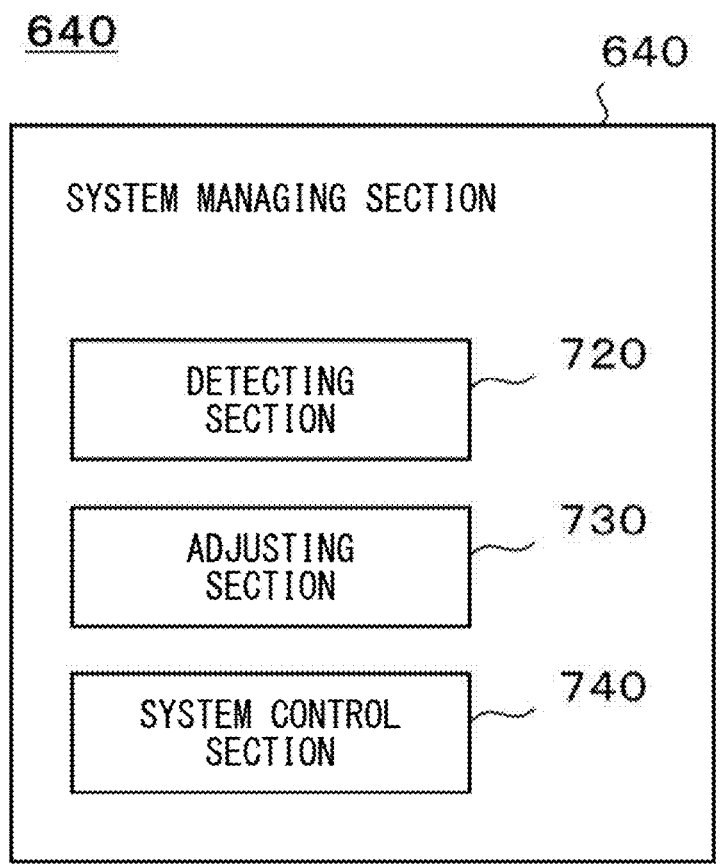
FIG. 7 schematically shows an example of an internal configuration of the system managing section 640.

FIG. 7 schematically shows an example of an internal configuration of the system managing section 640. In the present embodiment, the system managing section 640 includes a detecting section 720, an adjusting section 730, and a system control section 740.

The detecting section 720 may be an example of a change information acquiring section. The adjusting section 730 may be an example of a control apparatus, classifying section, trajectory information acquiring section, trajectory planning section, and trajectory determining section. The system control section 740 may be an example of an output section.

In the present embodiment, the detecting section 720 detects that (i) a change in the structure of the execution apparatus 120 has occurred, (ii) a change in the settings of the execution apparatus 120 has occurred, (iii) the target object of the execution apparatus 120 has been changed, or (iv) a change in the surrounding environment of the execution apparatus 120 has occurred. For example, if the model managing section 630 has acquired various types of change information, the detecting section 720 detects that a change has occurred in an attribute corresponding to this change information or that a change will occur in the near future. The detecting section 720 may detect this change by acquiring the output of various sensors arranged inside the target region 202. The detecting section 720 may output the information indicating that various changes have been detected to the adjusting section 730.

The change concerning the structure of the execution apparatus 120 is exemplified by a change concerning at least one of the position, the orientation, the shape, the size, a kinematic parameter, and a kinetic parameter of the robot arm 224. The change concerning the settings of the execution apparatus 120 is exemplified by a change concerning at least one of the start point, end point, movement velocity, and acceleration of the work tool 222, a change concerning the interference margin, or the like.

In the present embodiment, the adjusting section 730 adjusts the settings of the robot 214 when the detecting section 720 has detected any of the various changes. For example, the adjusting section 730 changes the setting relating to the trajectory of the work tool 222 of the robot 214, according to the content of the detected change. The details of the adjusting section 730 are described further below.

In the present embodiment, the system control section 740 controls the robot 214. For example, the system control section 740 outputs control information for controlling the operation of the manipulator 220. The system control section 740 outputs the control information for controlling the operation of the manipulator 220, based on the trajectory of the work tool 222 determined by the adjusting section 730, to the drive control section 250 of the robot 214.

Figure 8:
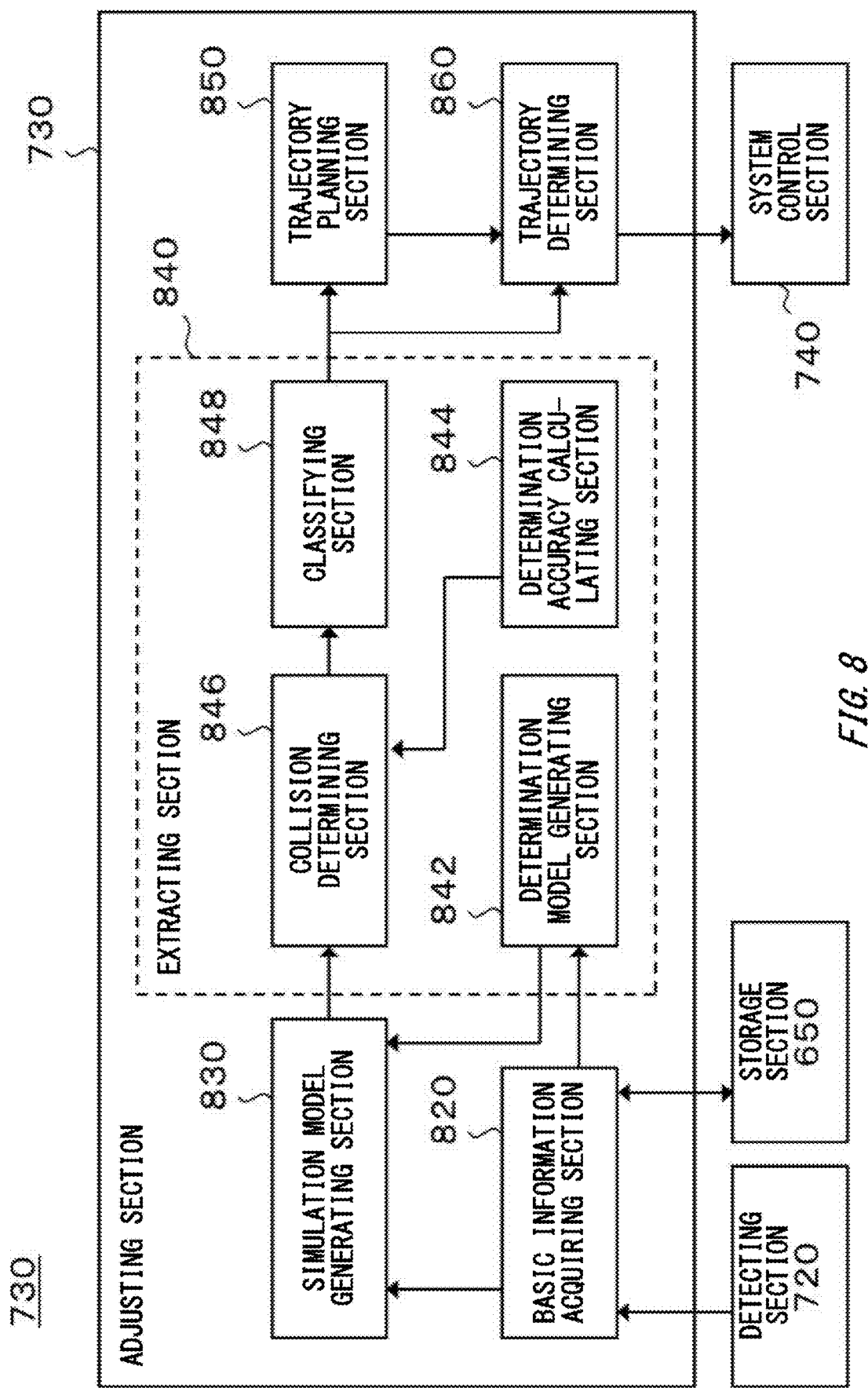
FIG. 8 schematically shows an example of an internal configuration of the adjusting section 730.

FIG. 8 schematically shows an example of an internal configuration of the adjusting section 730. In the present embodiment, the adjusting section 730 includes a basic information acquiring section 820, a simulation model generating section 830, an extracting section 840, a trajectory planning section 850, and a trajectory determining section 860. In the present embodiment, the extracting section 840 includes a determination model generating section 842, a determination accuracy computing section 844, a collision determining section 846, and a classification determining section 848.

In the present embodiment, the basic information acquiring section 820 acquires information (sometimes referred to as basic information) necessary for adjusting the settings of the robot 214. The basic information acquiring section 820 may acquire information indicating that a change has been detected and information indicating the content of this change, from the detecting section 720. For example, if the detecting section 720 has detected a change in at least one of the position, orientation, shape, and size of a specified body, the basic information acquiring section 820 acquires information indicating the position, orientation, shape, and size of this specified body after the change.

The basic information acquiring section 820 may reference the storage section 650 to acquire the information indicating the position, orientation, shape, and size of each of the one or more bodies arranged inside the target region 202. The basic information acquiring section 820 may reference the storage section 650 to acquire information identifying a body that is to be removed from inside the target region 202. The basic information acquiring section 820 may reference the storage section 650 to acquire information indicating the position, orientation, shape, and size of a new body to be added to the inside of the target region 202. The basic information acquiring section 820 may reference the storage section 650 to acquire information concerning the trajectory of the work tool 222. For example, the basic information acquiring section 820 acquires information indicating the one or more unit trajectories that form the newest overall trajectory.

The basic information acquiring section 820 may reference the storage section 650 to acquire information indicating the size of the interference margin. The basic information acquiring section 820 may reference the storage section 650 to acquire information concerning each type of setting to be used in the information processing by the extracting section 840. For example, the basic information acquiring section 820 acquires at least one of (i) a parameter for determining the size of the determination model with the determination model generating section 842 and (ii) a parameter for determining the determination accuracy with the determination accuracy computing section 844. The basic information acquiring section 820 may acquire these pieces of basic information from the input terminal 160.

In the present embodiment, the simulation model generating section 830 generates the simulation model for planning the trajectory of the work tool 222. In one embodiment, the simulation model generating section 830 generates the simulation model based on (i) the model of each of one or more objects arranged inside the target region 202, acquired by the basic information acquiring section 820, and (ii) the model of the manipulator 220 generated by the determination model generating section 842. These one or more objects may include an object that is to be newly added to the target region 202.

In another embodiment, the simulation model generating section 830 generates the simulation model based on (i) the model of the manipulator 220 acquired by the basic information acquiring section 820 and (ii) the model of each of one or more objects arranged inside the target region 202, generated by the determination model generating section 842. These one or more objects may include an object that is to be newly added to the target region 202.

In yet another embodiment, the simulation model generating section 830 generates the simulation model based on (i) the model of the manipulator 220 generated by the determination model generating section 842, (ii) the model generated by the determination model generating section 842 concerning at least some of the one or more objects arranged inside the target region 202, and the model generated by the basic information acquiring section 820 concerning the remaining objects among the one or more objects arranged inside the target region 202. These one or more objects may include an object that is to be newly added to the target region 202.

In the present embodiment, the extracting section 840 classifies the one or more unit trajectories before the change as (i) a unit trajectory in need of correction, in response to a change inside the target region 202 detected by the detecting section 720 or (ii) a unit trajectory not in need of correction, even if a change inside the target region 202 is detected by the detecting section 720. The extracting section 840 may output the information indicating the unit trajectories in need of correction to the trajectory planning section 850. On the other hand, the extracting section 840 may output information indicating the unit trajectories that are not in need of correction to the trajectory determining section 860.

In the present embodiment, the determination model generating section 842 generates a determination model in which some of the models acquired by the basic information acquiring section 820 are set to have at least one of the shape and size thereof as a default. The determination model generating section 842 may output the information indicating the position, orientation, shape, and size of the generated determination model to the simulation model generating section 830. The shape of the determination model may be a simpler shape than the shape of the model acquired by the basic information acquiring section 820.

In one embodiment, the determination model generating section 842 increases the size of the manipulator 220 to generate the determination model of the manipulator 220. The determination model generating section 842 may generate a model having a shape that is larger and simpler than the manipulator 220, and output this model as the determination model of the manipulator 220.

The determination model generating section 842 outputs a model that has a cylindrical pillar shape, a polygonal pillar shape, a spherical shape, or a combination of these shapes and contains therein the entirety of the manipulator 220, as the determination model of the manipulator 220. The polygonal pillar shape is exemplified by a triangular pillar, square pillar, hexagonal pillar, or the like. The determination model of the manipulator 220 may be an example of a first enlarged model.

The determination model generating section 842 acquires a parameter indicating the relationship between the size of the manipulator 220 and the size of the determination model from the basic information acquiring section 820, for example. This parameter may be a parameter indicating the size of the determination model relative to the size of the manipulator 220 (sometimes referred to as the expansion factor). The determination model generating section 842 may generate the determination model based on this parameter. This parameter is set such that the minimum distance between the contour of the manipulator 220 and the contour of the determination model is greater than the interference margin. In this way, the determination model that is larger than the model generated by the basic information acquiring section 820 and whose shape is simpler than the shape of the model acquired by the basic information acquiring section 820 is generated almost in real time. As a result, the collision determining section 846 can perform a collision determination process relatively accurately and with a low calculation amount.

Furthermore, the parameter described above can be changed at any time. For example, the determination model generating section 842 determines this parameter when the detecting section 720 has detected a change inside the target region 202. The determination model generating section 842 may determine this parameter according to the type of change. The type of change is exemplified by a change of the position of the manipulator 220, a change of the orientation of the manipulator 220, a change of the shape of the manipulator 220, a change of the size of the manipulator 220, and a combination of these changes. The type of change is exemplified by the addition of the manipulator 220 into the target region 202, the removal of the manipulator 220 from the inside of the target region 202, and the like. In this way, the size of the determination model is suitably changed according to a change in the environment. As a result, it is possible to obtain a suitable trajectory corresponding to the change in the environment, due to the recalculation of the trajectory.

In another embodiment, the determination model generating section 842 generates the determination model of a body by increasing the sizes of at least some of the one or more bodies arranged in the target region 202. This body may be a body that is not the manipulator 220. This body may be a body for which a change has been detected. This body may be a body newly arranged in the target region 202. This body may be a body to be removed from the target region 202. The determination model generating section 842 may generate a model having a larger and simpler shape than this body, and output this model as the determination model of this body.

The determination model generating section 842 outputs a model that has a cylindrical pillar shape, a polygonal pillar shape, a spherical shape, or a combination of these shapes and contains therein all of the bodies described above, as the determination model of this body. The polygonal pillar shape is exemplified by a triangular pillar, square pillar, hexagonal pillar, or the like. The determination model of the body arranged in the target region 202 may be an example of a second enlarged model.

The determination model generating section 842 acquires a parameter indicating the relationship between the size of each body arranged in the target region 202 and the size of the determination model from the basic information acquiring section 820, for example. This parameter may be a parameter indicating the size of the determination model relative to the size of each body (sometimes referred to as the enlargement factor). The determination model generating section 842 may generate the determination model based on this parameter. This parameter is set such that the minimum distance between the contour of each body and the contour of the determination model is greater than the interference margin. In this way, the determination model that is larger than the model generated by the basic information acquiring section 820 and whose shape is simpler than the shape of the model acquired by the basic information acquiring section 820 is generated almost in real time. As a result, the collision determining section 846 can perform a collision determination process relatively accurately and with a low calculation amount.

Furthermore, the parameter described above can be changed at any time. For example, the determination model generating section 842 determines this parameter when the detecting section 720 has detected a change inside the target region 202. The determination model generating section 842 may determine this parameter according to the type of change. The type of change is exemplified by a change of the position of the body, a change of the orientation of the body, a change of the shape of the body, a change of the size of the body, and a combination of these changes. The type of change is exemplified by the addition of the body into the target region 202, the removal of the body from the inside of the target region 202, and the like. In this way, the size of the determination model is suitably changed according to a change in the environment. As a result, it is possible to obtain a suitable trajectory corresponding to the change in the environment, due to the recalculation of the trajectory.

In the present embodiment, the determination accuracy computing section 844 computes the value of the parameter indicating the determination accuracy of the collision determining section 846. As described further below, the collision determining section 846 performs a collision determination process at M locations (where M is an integer greater than or equal to 1) on a unit trajectory. In other words, for one unit trajectory, M collision determination processes are performed. The parameter indicating the determination accuracy may be a time period during which the collision determination process is performed for each unit trajectory, or may be the number of times M that the collision determination process is performed for each unit trajectory.

In one embodiment, the determination accuracy computing section 844 computes the value of the parameter indicating the determination accuracy based on at least one of the size of the manipulator 220 and the size of the determination model of the manipulator 220. The determination accuracy computing section 844 may compute the value of the parameter indicating the determination accuracy based on the value of a parameter indicating the relationship between the size of the manipulator 220 and the size of the determination model.

For example, the determination accuracy computing section 844 computes the value of the parameter indicating the determination accuracy such that the value of M described above becomes larger when the size of the manipulator 220 is larger. The determination accuracy computing section 844 may compute the value of the parameter indicating the determination accuracy such that the value of M described above becomes smaller when the size of the manipulator 220 is larger.

For example, the determination accuracy computing section 844 may compute the value of the parameter indicating the determination accuracy such that the value of M described above becomes larger when the size of the determination model of the manipulator 220 is larger relative to the size of the manipulator 220 (i.e. when the expansion factor of the determination model is larger). The determination accuracy computing section 844 may compute the value of the parameter indicating the determination accuracy such that the value of M described above becomes smaller when the size of the determination model of the manipulator 220 is larger relative to the size of the manipulator 220.

In another embodiment, the determination accuracy computing section 844 computes the value of the parameter indicating the determination accuracy based on at least one of the size of a body arranged in the target region 202 and the size of the determination model of this body. The determination accuracy computing section 844 may compute the value of the parameter indicating the determination accuracy based on the value of a parameter indicating the relationship between the size of this body and the size of the determination model of this body.

For example, the determination accuracy computing section 844 computes the value of the parameter indicating the determination accuracy such that the value of M described above becomes larger when the size of the body described above is larger. The determination accuracy computing section 844 may compute the value of the parameter indicating the determination accuracy such that the value of M described above becomes smaller when the size of the body described above is larger.

For example, the determination accuracy computing section 844 computes the value of the parameter indicating the determination accuracy such that the value of M described above becomes larger when the size of the determination model of the body described above is larger relative to the size of this body (i.e. when the expansion factor of the determination model is larger). The determination accuracy computing section 844 may compute the value of the parameter indicating the determination accuracy such that the value of M described above becomes smaller when the size of the determination model of the body described above is larger relative to the size of this body.

In another embodiment, the determination accuracy computing section 844 computes the value of the parameter indicating the determination accuracy based on the relationship between the operation of the manipulator 220 in a joint space and the operation of the manipulator 220 in a real space. For example, the determination accuracy computing section 844 computes the value of the parameter indicating the determination accuracy such that the value of M described above becomes larger when the degree of freedom of the manipulator 220 is greater. The determination accuracy computing section 844 may compute the value of the parameter indicating the determination accuracy such that the value of M described above becomes smaller when the degree of freedom of the manipulator 220 is greater.

In the present embodiment, the collision determining section 846 performs the collision determination process for each of the one or more unit trajectories, using the simulation models generated by the simulation model generating section 830. With the collision determination process, it is possible to determine whether two bodies will collide, by determining the states of several inequalities. In this way, it is possible to determine whether there is interference using a relatively small calculation amount.

Another method that can be considered for determining whether there is interference includes detecting the minimum distance between two bodies and determining whether there is interference based on this minimum distance. However, in this distance determination, the distance between each of a plurality of points on the contour of one body and each of a plurality of points on the contour of the other body must be calculated, and therefore there is an extremely high calculation amount.

In the present embodiment, the collision determining section 846 performs the collision determination process using the model in which the at least one of the manipulator 220 and a body other than the manipulator 220 arranged inside the target region 202 is a default. In this way, it is possible to restrict the calculation amount to several hundredths of the calculation amount in a case where a determination is made concerning whether to replan the trajectory by calculating the distance between the manipulator 220 and the body described above.

For example, the collision determining section 846 performs the collision determination process using the model obtained by enlarging the manipulator 220 or a portion thereof (e.g. the work tool 222 or the robot arm 224) and a model of the actual dimensions of the workpiece 20, the obstacle 320, and the obstacle 420. The collision determining section 846 may perform the collision determination process using the model of the actual dimensions of the workpiece 20 and the manipulator 220 and models obtained by enlarging the obstacle 320 and the obstacle 420. The collision determining section 846 may perform the collision determination process using the model of the actual dimensions of the workpiece 20, a model obtained by enlarging the manipulator 220 or a portion thereof (e.g. the work tool 222 or the robot arm 224), and modles obtained by enlarging the obstacle 320 and the obstacle 420. The collision determining section 846 may perform the collision determination process using a model obtained by enlarging the workpiece 20.

The collision determining section 846 may, for each of the one or more unit trajectories forming the overall trajectory, determine whether there would be a collision between (i) a determination model or a model of each of one or more bodies arranged in the target region 202 and (ii) the determination model of the manipulator 220, at each of the M locations on each unit trajectory. The collision determining section 846 may, for each of the one or more unit trajectories forming the overall trajectory, determine whether there would be a collision between (i) a determination model or a model of a body for which a change has been detected, among the one or more bodies arranged in the target region 202, and (ii) the determination model of the manipulator 220, at each of the M locations on each unit trajectory.

The collision determining section 846 may, for each of the one or more unit trajectories forming the overall trajectory, determine whether there would be a collision between (i) a determination model of each of one or more bodies arranged in the target region 202 and (ii) the determination model or model of the manipulator 220, at each of the M locations on each unit trajectory. The collision determining section 846 may, for each of the one or more unit trajectories forming the overall trajectory, determine whether there would be a collision between (i) a determination model of a body for which a change has been detected, among the one or more bodies arranged in the target region 202 and (ii) the determination model or model of the manipulator 220, at each of the M locations on each unit trajectory.

The one or more bodies arranged in the target region 202 described above may include a body to be newly added to the inside of the target region 202. These one or more bodies arranged in the target region 202 may include a body to be removed from the inside of the target region 202. In this way, the extracting section 840 can extract unit trajectories for which there is a high possibility of a more suitable unit trajectory existing, in the embodiment described in relation to FIG. 5.

In a case where it is determined by the collision determination process using the determination models that there would be a collision between the manipulator 220 and a body for which a change concerning at least one of the position, orientation, shape, and size thereof has occurred in a specified unit trajectory, this unit trajectory is determined to be a unit trajectory for which the relationship degree with the body for which this change was detected is high. This unit trajectory may be determined to be a unit trajectory that has a high degree of necessity for replanning the trajectory.

If this body for which a change has been detected is a body to be removed from the inside of the target region 202, the collision determination process may be performed by performing a procedure similar to the procedure described above, while assuming that this body is at the position where it would be before being removed. If it is determined by the collision determination process described above that the body to be removed and the manipulator 220 would collide in the specified unit trajectory, this unit trajectory is determined to be a unit trajectory for which the relationship degree with respect to the body to be removed is high, for example. This unit trajectory may be determined to be a unit trajectory that has a high degree of necessity for replanning the trajectory.

The collision determining section 846 does not need to perform the collision determination process for all of the M points on the unit trajectories. If it is determined that a collision would occur at one location on a unit trajectory, the collision determining section 846 may skip the collision determination process for the locations in this unit trajectory where the collision determination process has not yet been performed, among these M locations. In this way, it is possible to further reduce the calculation amount.

Similarly, the collision determining section 846 may, for each of the one or more unit trajectories, determine whether there would be a collision between (i) the determination model of at least one of the one or more bodies arranged in the target region 202 and (ii) the determination model of the manipulator 220, at each of the M locations on each trajectory. The collision determining section 846 may, for each of the one or more unit trajectories, determine whether there would be a collision between (i) a determination model of each of one or more bodies arranged in the target region 202 and (ii) the model of the manipulator 220, at each of the M locations on each trajectory.

Similarly, the collision determining section 846 may, for each of the one or more unit trajectories, determine whether there would be a collision between (i) the determination model of at least one of the one or more bodies arranged in the target region 202 and (ii) the model of the manipulator 220, at each of the M locations on each trajectory. The collision determining section 846 may, for each of the one or more unit trajectories, determine whether there would be a collision between (i) a determination model of each of one or more bodies arranged in the target region 202 and (ii) the model of the manipulator 220, at each of the M locations on each trajectory.

In the present embodiment, the classification determining section 848 classifies each of the one or more unit trajectories forming the overall trajectory as a unit trajectory that needs to be corrected or a unit trajectory that does not need to be corrected. The classification determining section 848 determines that a unit trajectory that has been determine by the collision determining section 846 to result in a collision at at least one point in this unit trajectory, among the one or more unit trajectories, is a trajectory that needs correction. The unit trajectory that has been determined by the collision determining section 846 to result in a collision at at least one point in this unit trajectory may be an example of a trajectory having a large relationship degree with respect to one or more bodies arranged in the target region 202.

The classification determining section 848 may determine that a unit trajectory that has been determined by the collision determining section 846 to not result in a collision at any of the M locations in this unit trajectory, among the one or more unit trajectories, is a trajectory that does not need correction. The unit trajectories that do not need correction may be determined by removing the unit trajectories that do need correction from among the one or more unit trajectories forming the overall trajectory. A unit trajectory that has been judged by the collision determining section 846 to not result in a collision at any of the M locations on this unit trajectory may be an example of a trajectory having a small relationship degree with respect to one or more bodies arranged in the target region 202.

In the present embodiment, the classification determining section 848 outputs information indicating unit trajectories that need correction to the trajectory planning section 850. The classification determining section 848 may output information indicating the unit trajectories that do not need correction to the trajectory determining section 860.

In the present embodiment, the trajectory planning section 850 plans the trajectory of the work tool 222 for each unit trajectory that needs correction. The method for planning the trajectory of each unit trajectory is not particularly limited. For example, the trajectory planning section 850 may plan each unit trajectory according to the procedure described in Japanese Patent No. 6325174.

The trajectory planning section 850 may plan the trajectory of the work tool 222 using the simulation models constructed by using the model of the manipulator 220 and the models of one or more bodies arranged in the target region 202. The models in this case are the models obtained by reproducing the actual manipulator 220 and bodies, and are not the default determination models. Furthermore, in the present embodiment, the models of the one or more bodies described above include models of bodies that are to be newly added to the target region 202. Yet further, the models of the one or more bodies described above do not include models of bodies that have been removed from the target region 202.

In the present embodiment, the trajectory determining section 860 determines the overall trajectory of the work tool 222. For example, the trajectory determining section 860 determines the trajectory of the work tool 222 that has passed through a series of work operations based on (i) information concerning the unit trajectories determined to need correction by the extracting section 840 and indicating the unit trajectories that have been replanned by the trajectory planning section 850 and (ii) information indicating the unit trajectories that have been determined to not need correction by the extracting section 840.

As described above, according to the present embodiment, the adjusting section 730 constructs a simulation model using the determination models, which have dimensions larger than the actual objects, of at least one of a body for which a change has been detected and the manipulator 220, and performs a collision determination process to determine collision between these objects for all of the unit trajectories forming the overall trajectory. After this, the adjusting section 730 replans the unit trajectories in which a collision was determined according to this collision determination process. On the other hand, the unit trajectories in which a collision was not determined according to this collision determination process are reused. In this way, it is possible to generate a suitable overall trajectory corresponding to any changes, in a very short time.

While the embodiments of the present invention have been described, the technical scope of the invention is not limited to the above described embodiments. It is apparent to persons skilled in the art that various alterations and improvements can be added to the above-described embodiments. Features described in relation to certain embodiments can be applied to other embodiments, as long as this does not cause a technical contradiction. Each configurational element may have the same features as other configurational elements with different reference numbers but the same name. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A control apparatus for controlling operation of a work robot for performing work inside a target region using a manipulator, the control apparatus comprising:
   a change information acquiring unit configured, when a first body manipulated by the manipulator of the work robot is arranged inside the target region, to acquire at least one of (i) first change information that represents removal of the first body from the target region or (ii) second change information representing that a new body for manipulation by the manipulator of the work robot is to be arranged inside the target region;
   a model information acquiring unit configured to acquire at least one of (i) first model information representing at least one of a position, orientation, shape, or size of the first body or (ii) second model information representing at least one of position, orientation, shape, or size of the new body;
   a trajectory information acquiring unit configured to acquire N−1 or N pieces of trajectory information respectively representing N−1 or N trajectories connecting N work regions where the work robot performs a series of work operations;

a classifying unit configured to classify each trajectory of the N−1 or N trajectories as one of: (i) a trajectory that needs correction due to a change the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and a trajectory planning unit configured, for each trajectory classified by the classifying unit as needing correction, to plan a new trajectory for a tip of the manipulator to move between two work regions relating to the trajectory classified as needing correction, wherein the new trajectory is planned based on at least one of the first model information or the second model information, wherein the classifying unit includes:

a first enlarged model generating unit configured to generate a first enlarged model, which is (i) a model of the manipulator that is obtained by increasing a size of the manipulator or (ii) a model of the manipulator that is formed by a shape that is larger than the manipulator and contains an entirety of the manipulator; and a determining unit configured to determine:
(a) whether there would be a collision, at a respective location or respective set of locations on each of the N−1 or N trajectories, between (i) a model of the new body as represented by the second model information and (ii) the first enlarged model, and
(b) that one or more of the N−1 or N trajectories, for which there would be a collision, need correction, wherein N is an integer greater than or equal to 2.

2. The control apparatus according to claim 1, further comprising:

a second enlarged model generating unit configured to generate a second enlarged model, which is (i) a model of the new body that is obtained by increasing the size of the new body represented by the second model information or (ii) a model of the new body that is formed by a shape that is larger than the new body and that contains an entirety of the new body, wherein the determining unit is configured to determine:

whether there would be a collision, at the respective location or respective set of locations on each of the N−1 or N trajectories, between (i) the second enlarged model and (ii) the first enlarged model, and that one or more of the N−1 or N trajectories, for which there would be a collision, need correction.

3. A control apparatus for controlling operation of a work robot for performing work inside a target region using a manipulator, the control apparatus comprising:

a change information acquiring unit configured, when a first body manipulated by the manipulator of the work robot is arranged inside the target region, to acquire at least one of (i) first change information that represents removal of the first body from the target region or (ii) second change information representing that a new body for manipulation by the manipulator of the work robot is to be arranged inside the target region;

a model information acquiring unit configured to acquire at least one of (i) first model information representing at least one of a position, orientation, shape, or size of the first body or (ii) second model information representing at least one of position, orientation, shape, or size of the new body;

a trajectory information acquiring configured to acquire N−1 or N pieces of trajectory information respectively representing N−1 or N trajectories connecting N work regions where the work robot performs a series of work operations;

a classifying unit configured to classify each trajectory of the N−1 or N trajectories as one of: (i) a trajectory that needs correction due to a change the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and a trajectory planning unit configured, for each trajectory classified by the classifying unit as needing correction, to plan a new trajectory for a tip of the manipulator to move between two work regions relating to the trajectory classified as needing correction, wherein the new trajectory is planned based on at least one of the first model information or the second model information, wherein the classifying unit includes:

an enlarged model generating unit configured to generate an enlarged model, which is (i) a model of the new body that is obtained by increasing the size of the new body as the second model information or (ii) a model of the new body that is formed by a shape that is larger than the new body and that contains an entirety of the new body; and a determining unit that is configured to determine:
(a) whether there would be a collision, at a respective location or respective set of locations on each of the N−1 or N trajectories, between (i) a model of the manipulator and (ii) the enlarged model, and
(b) that one or more of the N−1 or N trajectories, which there would be a collision, need correction, wherein N is an integer greater than or equal to 2.

4. The control apparatus according to claim 1, wherein the determining unit is configured to determine whether there would be the collision between the model of the new body and the first enlarged model at M respective locations on each of the N−1 or N trajectories, and the classifying unit further includes an accuracy computing unit configured to compute a value of M based on at least one of the size of the manipulator and a size of the first enlarged model.

5. The control apparatus according to claim 1, wherein the determining unit is configured to determine whether there would be the collision between the model of the new body and the first enlarged model at M respective locations on each of the N−1 or N trajectories, and the classifying unit further includes an accuracy computing unit configured to compute a value of M based on a correspondence relationship between operation of the manipulator in a joint space and operation of the manipulator in a real space.

6. The control apparatus according to claim 1, further comprising:

a trajectory determining unit configured to determine the new trajectory, which is for the tip of the manipulator to move throughout the series of work operations, based on (i) information representing a position and orientation of the tip of the manipulator in trajectories identified by the trajectory planning unit as needing to be corrected and (ii) information representing the position and orientation of the tip of the manipulator in trajectories acquired by the trajectory information acquiring unit that do not need to be corrected.

7. The control apparatus according to claim 6, further comprising:
an output unit configured to output control information for controlling the operation of the manipulator, based on the new trajectory, which is for movement of the tip of the manipulator, determined by the trajectory determining unit.

8. A non-transitory computer-readable medium having processor instructions stored thereon that, when executed by a processor, cause the processor to perform operations for controlling a work robot for performing work inside a target region using a manipulator, the operations comprising:
acquiring, when a first body manipulated by the manipulator of the work robot is arranged inside the target region, at least one of (i) first change information that represents removal of the first body from the target region or (ii) second change information representing that a new body for manipulation by the manipulator of the work robot is to be arranged inside the target region;
acquiring at least one of (i) first model information representing at least one of a position, orientation, shape, or size of the first body or (ii) second model information representing at least one of position, orientation, shape, or size of the new body;
acquiring N−1 or N pieces of trajectory information respectively representing N−1 or N trajectories connecting N work regions where the work robot performs a series of work operations;
classifying each trajectory of the N−1 or N trajectories as one of: (i) a trajectory that needs correction due to the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and
planning, for each trajectory classified as needing correction, a new trajectory for a tip of the manipulator to move between two work regions relating to the trajectory which is classified as needing correction, wherein the new trajectory is planned based on at least one of the first model information or the second model information,
wherein
the classifying step includes:
generating a first enlarged model, which is (i) a model of the manipulator that is obtained by increasing a size of the manipulator or (ii) a model of the manipulator that is formed by a shape that is larger than the manipulator and contains an entirety of the manipulator; and
determining:
(a) whether there would be a collision, at a respective location or respective set of locations on each of the N−1 or N trajectories, between (i) a model of the new body as represented by the second model information and (ii) the first enlarged model, and
(b) that one or more of the N−1 or N trajectories, for which there would be a collision, need correction,
wherein N is an integer greater than or equal to 2.

9. A control method for controlling operation of a work robot for performing work inside a target region using a manipulator, the control method comprising:
acquiring, when a first body manipulated by the manipulator of the work robot is arranged inside the target region, at least one of (i) first change information that represents removal of the first body from the target region or (ii) second change information representing that a new body for manipulation by the manipulator of the work robot is to be arranged inside the target region;
acquiring at least one of (i) first model information representing at least one of a position, orientation, shape, or size of the first body or (ii) second model information representing at least one of position, orientation, shape, or size of the new body;
acquiring N−1 or N pieces of trajectory information respectively representing N−1 or N trajectories connecting N work regions where the work robot performs a series of work operations;
classifying each trajectory of the N−1 or N trajectories as one of: (i) a trajectory that needs correction due to the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and
planning, for each trajectory classified as needing correction, a new trajectory for a tip of the manipulator to move between two work regions relating to the trajectory which is classified as needing correction wherein the new trajectory is planned based on at least one of the first model information or the second model information,
wherein
the classifying step includes:
generating a first enlarged model, which is (i) a model of the manipulator that is obtained by increasing a size of the manipulator or (ii) a model of the manipulator that is formed by a shape that is larger than the manipulator and contains an entirety of the manipulator; and
determining:
(a) whether there would be a collision, at a respective location or respective set of locations on each of the N−1 or N trajectories, between (i) a model of the new body as represented by the second model information and (ii) the first enlarged model, and
(b) that one or more of the N−1 or N trajectories, for which there would be a collision, need correction,
wherein N is an integer greater than or equal to 2.

10. A control method for controlling operation of a work robot for performing work inside a target region using a manipulator, the control method comprising:
acquiring, when a first body manipulated by the manipulator of the work robot is arranged inside the target region, at least one of (i) first change information that represents removal of the first body from the target region or (ii) second change information representing that a new body for manipulation by the manipulator of the work robot is to be arranged inside the target region;
acquiring at least one of (i) first model information representing at least one of a position, orientation, shape, or size of the first body or (ii) second model information representing at least one of position, orientation, shape, or size of the new body;

acquiring N−1 or N pieces of trajectory information respectively representing N−1 or N trajectories connecting N work regions where the work robot performs a series of work operations;

classifying each trajectory of the N−1 or N trajectories as one of: (i) a trajectory that needs correction due to the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and planning, for each trajectory classified as needing correction, a new trajectory for a tip of the manipulator to move between two work regions relating to the trajectory which is classified as needing correction, wherein the new trajectory is planned based on at least one of the first model information or the second model information, wherein the classifying step includes:

generating an enlarged model, which is (i) a model of the new body that is obtained by increasing the size of the new body represented by the second model information or (ii) a model of the new body that is formed by a shape larger than the new body and that contains an entirety of the new body; and determining:

(a) whether there would be a collision, at a respective location or respective set of locations on each of the N−1 or N trajectories, between (i) a model of the manipulator and (ii) the enlarged model, and (b) that one or more of the N−1 or N trajectories, for which there would be a collision, need correction, wherein N is an integer greater than or equal to 2.

11. The control apparatus according to claim 3, wherein the determining unit is configured to determine whether there would be the collision between the model of the manipulator and the enlarged model at M respective locations on each of the N−1 or N trajectories, and the classifying unit further includes an accuracy computing unit configured to compute a value of M based on at least one of the size of the manipulator and a size of the enlarged model.

12. The control apparatus according to claim 3, wherein the determining unit is configured to determine whether there would be the collision between the model of the manipulator and the enlarged model at M respective locations on each of the N−1 or N trajectories, and the classifying unit further includes an accuracy computing unit configured to compute a value of M based on a correspondence relationship between operation of the manipulator in a joint space and operation of the manipulator in a real space.

13. The control apparatus according to claim 3, further comprising:

a trajectory determining unit configured to determine the new trajectory, which is for the tip of the manipulator to move throughout the series of work operations, based on (i) information representing a position and orientation of the tip of the manipulator in trajectories identified by the trajectory planning unit as needing to be corrected and (ii) information representing the position and orientation of the tip of the manipulator in trajectories acquired by the trajectory information acquiring unit that do not need to be corrected.

14. The control apparatus according to claim 13, further comprising:

an output unit configured to output control information for controlling the operation of the manipulator, based on the new trajectory, which is for movement of the tip of the manipulator, determined by the trajectory determining unit.

15. A non-transitory computer-readable medium having processor instructions stored thereon that, when executed by a processor, cause the processor to perform operations for controlling a work robot for performing work inside a target region using a manipulator, the operations comprising:

acquiring, when a first body manipulated by the manipulator of the work robot is arranged inside the target region, at least one of (i) first change information that represents removal of the first body from the target region or (ii) second change information representing that a new body for manipulation by the manipulator of the work robot is to be arranged inside the target region;

acquiring at least one of (i) first model information representing at least one of a position, orientation, shape, or size of the first body or (ii) second model information representing at least one of position, orientation, shape, or size of the new body;

acquiring N−1 or N pieces of trajectory information respectively representing N−1 or N trajectories connecting N work regions where the work robot performs a series of work operations;

classifying each trajectory of the N−1 or N trajectories as one of: (i) a trajectory that needs correction due to the removal of the first body from the target region, as represented by the first change information, or due to the new body being arranged inside the target region, as represented by the second change information or (ii) a trajectory that does not need correction even if the first body is removed from the target region or even if the new body is arranged inside the target region; and planning, for each trajectory classified as needing correction, a new trajectory for a tip of the manipulator to move between two work regions relating to the trajectory which is classified as needing correction, wherein the new trajectory is planned based on at least one of the first model information or the second model information, wherein the classifying step includes:

generating an enlarged model, which is (i) a model of the new body that is obtained by increasing the size of the new body represented by the second model information or (ii) a model of the new body that is formed by a shape larger than the new body and that contains an entirety of the new body; and determining:

(a) whether there would be a collision, at a respective location or respective set of locations on each of the N−1 or N trajectories, between (i) a model of the manipulator and (ii) the enlarged model, and (b) that one or more of the N−1 or N trajectories, for which there would be a collision, need correction, wherein N is an integer greater than or equal to 2.

16. The control apparatus according to claim 1, wherein the change information acquiring unit is configured to acquire the first change information.

17. The control apparatus according to claim 16, wherein the first change information represents removal, from the target region, of a first workpiece manipulated by the manipulator of the work robot, wherein the first body is the first workpiece.

18. The control apparatus according to claim 1, wherein the change information acquiring unit is configured to acquire the second change information.

* * * * *